United States Patent [19]

Takizawa

[11] Patent Number: 5,016,495

[45] Date of Patent: May 21, 1991

[54] ENGINE BRAKE RUNNING CONTROL FOR AUTOMATIC TRANSMISSION IN AUTOMATIC DRIVE RANGE

[75] Inventor: Satoshi Takizawa, Yokosuka, Japan

[73] Assignee: Nissan Motor Co., Ltd., Yokohama, Japan

[21] Appl. No.: 375,967

[22] Filed: Jul. 6, 1989

[30] Foreign Application Priority Data

Jul. 6, 1988 [JP] Japan .............................. 63-166984

[51] Int. Cl.$^5$ ...................... F16H 59/48; F16H 59/54; F16H 59/68
[52] U.S. Cl. ...................................... 74/866; 192/4 A
[58] Field of Search .................. 74/862, 866; 192/4 A

[56] References Cited

U.S. PATENT DOCUMENTS

| | | | |
|---|---|---|---|
| 4,142,613 | 3/1979 | Iijima | 192/4 A |
| 4,350,234 | 9/1982 | Suga et al. | 192/4 A |
| 4,370,904 | 2/1983 | Müller et al. | 74/866 |
| 4,617,840 | 10/1986 | Yamakawa et al. | 74/865 |
| 4,637,278 | 1/1987 | Nishikawa et al. | 74/866 |
| 4,680,992 | 7/1987 | Hayasaki et al. | 74/869 |
| 4,803,899 | 2/1989 | Kumura | 74/866 |
| 4,829,435 | 5/1989 | Isono | 192/4 A |
| 4,852,006 | 7/1989 | Sperenza | 74/866 |
| 4,862,362 | 8/1989 | Kurihara et al. | 74/866 |

OTHER PUBLICATIONS

"Nissan Automatic Transmission L4N71B Type, E4N71B Type, Service Manual", 1982 (A261C04).

"Nissan Full-Range Automatic Transmission RE4R-01A Type, Service Manual", (A261C07), Mar. 1987.

Primary Examiner—Allan D. Herrmann
Assistant Examiner—Khoi Q. Ta
Attorney, Agent, or Firm—Foley & Lardner

[57] ABSTRACT

An engine brake running control system determines a new gear position which an automatic transmission should be downshifted to and conditioned for engine brake running as a function of a present gear position detected, a vehicle speed, and a deceleration which the automotive vehicle is subject to.

4 Claims, 11 Drawing Sheets

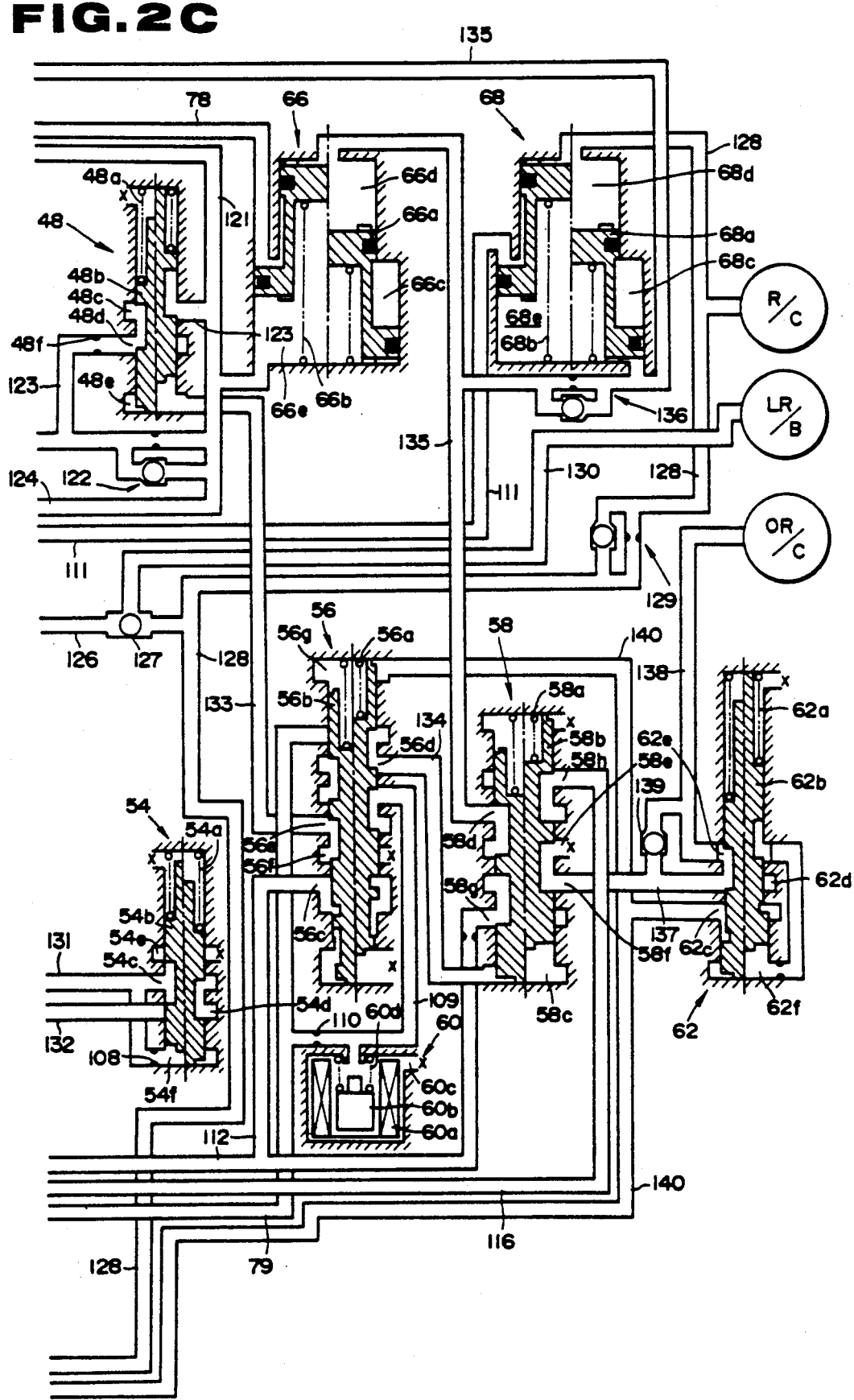

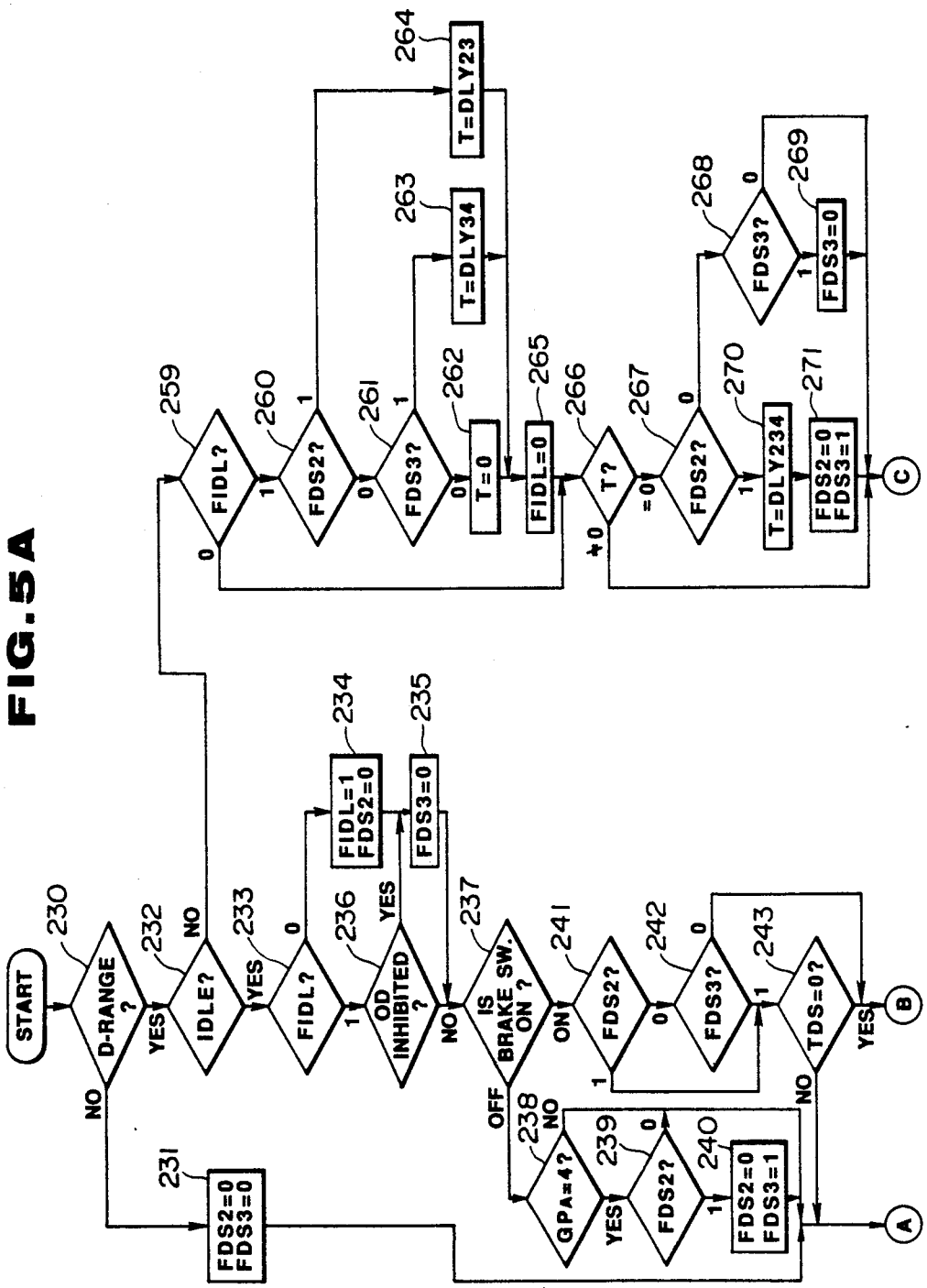

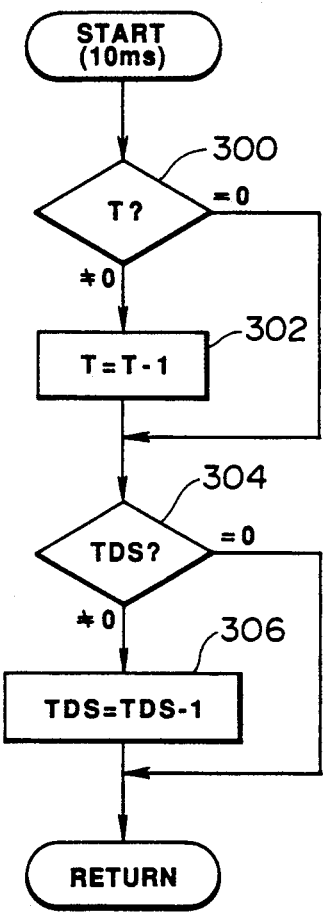
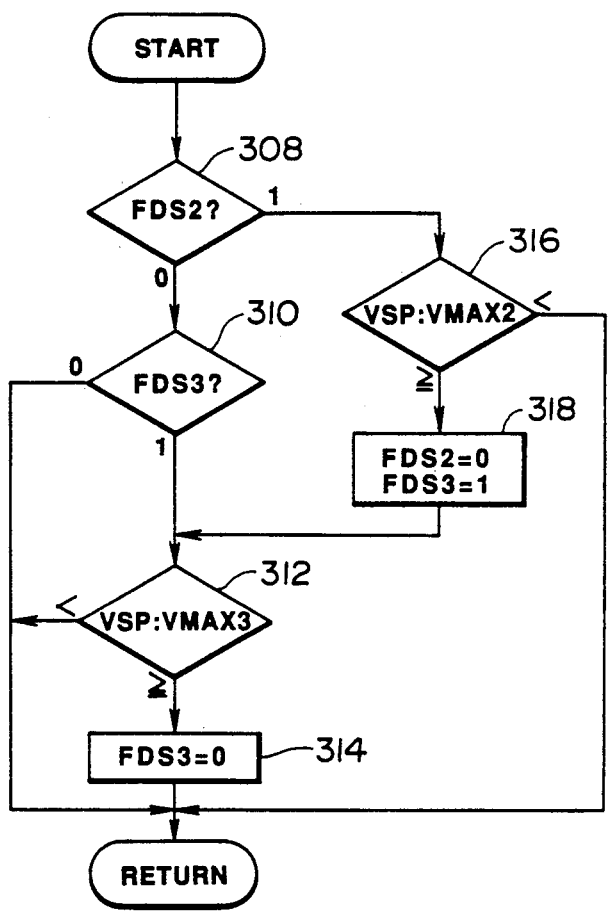

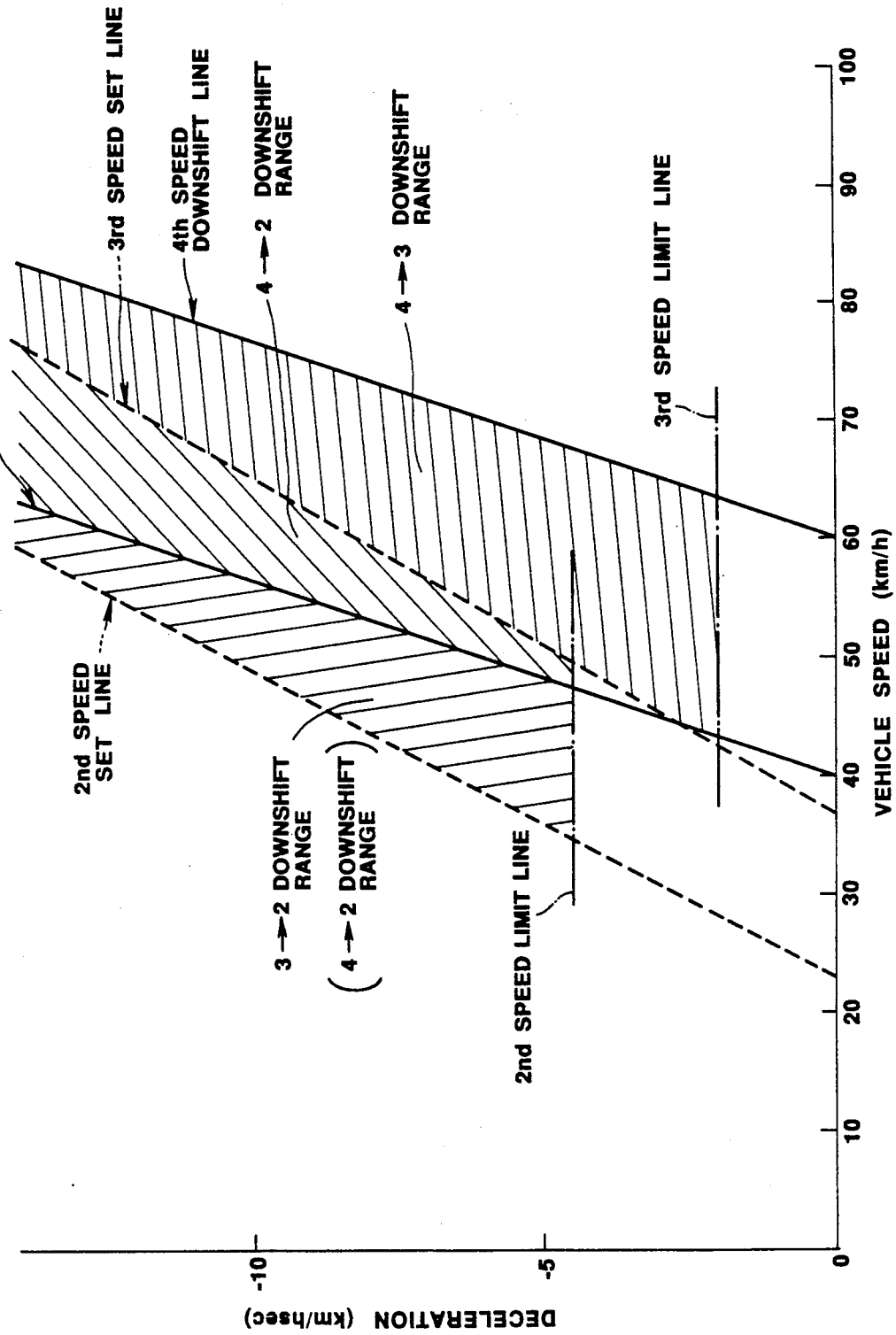

ENGINE BRAKE RUNNING CONTROL FOR AUTOMATIC TRANSMISSION IN AUTOMATIC DRIVE RANGE

RELATED APPLICATIONS

U.S. patent application Ser. No. 07/336,431 in the name of Satoshi TAKIZAWA, filed on Apr. 11, 1989, and U.S. patent application Ser. No. 07/342,144 in the name of Satoshi TAKIZAWA, filed on Apr. 24, 1989.

BACKGROUND OF THE INVENTION

The present invention relates to an engine brake running control for an automatic transmission when the automatic transmission operates in an automatic drive range, viz., a "D" range.

An automatic transmission of the E4N71B type is known. This automatic transmission is manufactured by Nissan Motor Company Limited in Japan and described in a publication "Nissan Automatic Transmission L4N71B Type, E4N71B Type, Service Manual 1982 (A261C04)" issued by Nissan Motor Company Limited on November in 1982. This known transmission comprises a downshift solenoid, a shift switch, an idle switch, a vehicle speed sensor, a brake switch, and a control unit. As described on page 12 of the above-mentioned publication, the downshift solenoid is rendered ON when the shift switch indicates that the third gear position is established in D range, the vehicle speed sensor detects a vehicle speed falling in a predetermined range from 30 km/h to 50 km/h, the brake switch is rendered ON, and the idle contacts of the throttle switch are rendered ON. According to this known downshift control, whenever the above mentioned conditions are met, a downshift is made to the adjacent one low gear position, and further downshift will not be made. Thus, if more effective engine brake is needed, it is necessary to shift a manual selector to a manual select range position, such as "2" range or "1" range.

The Applicant has proposed in the above-mentioned U.S. patent application Ser. No. 07/342,144 filed on Apr. 24, 1989 how to determine a new gear position which an automatic transmission should be downshifted to and conditioned for an engine brake running when the automatic transmission operates in a D range (an automatic drive range). According to this previous proposal, the new gear position is determined in response to a deceleration which the automotive vehicle is subject to after a brake pedal has been depressed. More specifically, predetermined deceleration values are provided for different gear positions and an appropriate one of them which corresponds to the present gear position which the automatic transmission is conditioned in is selected and compared with the actual deceleration detected. In response to the result of this comparison, a new gear position lower than the present gear position is determined.

An object of the present invention is to improve the previously proposed engine brake running control such that a new gear position which the automatic transmission should be downshifted to and conditioned for engine brake running is determined in a manner to compromise different requirements.

SUMMARY OF THE INVENTION

According to one aspect of the present invention, there is provided an engine brake running control system for an automotive vehicle including a brake pedal and an automatic transmission shiftable in gear position according to a predetermined shift point mapping when the automatic transmission operates in an automatic drive range, the engine brake running control system comprising;

means for detecting a depression of the brake pedal, means for determining a vehicle speed which the automotive vehicle is running at, means for determining a deceleration which the automotive vehicle is subject to, means for detecting a present gear position which the automatic transmission is conditioned in, means for determining a reference deceleration value in response to said present gear position detected and the vehicle speed detected, comparing the deceleration determined with the reference deceleration value determined and determining a new gear position lower than the present gear position which the automatic transmission should be downshifted to in response to the comparing result, and means for effecting a downshift from the present gear position in the automatic transmission to the new gear position determined to condition the same in a state for engine brake running at the new gear position when the automatic transmission operates in the automatic drive range.

According to a specific aspect of the present invention, there is provided an engine brake running control system of the above defined type, wherein the reference decleration value determining means has a memory storing a predetermined downshift schedule line consisting of a set of deceleration values retrievable versus the vehicle speed, and a speed set line consisting of a different set of deceleration values retrievable versus the vehicle speed, and means for retrieving the downshift line when the present gear position is equal to a predetermined gear position to determine a first deceleration value corresponding to the vehicle speed detected, comparing the deceleration detected with the first deceleration value; means responsive to the result of the comparison for retrieving the speed set line versus the vehicle speed detected to determine a second deceleration value, and means for comparing the deceleration detected with the second deceleration value, and means for determining the new gear position responsive to the result of the comparison of the deceleration value with the second deceleration value.

According to another aspect of the present invention, there is provided an engine brake running control method for an automotive vehicle including a brake pedal and an automatic transmission shiftable in gear position according to a predetermined shift pattern when the automatic transmission operates in an automatic drive range, the engine brake running control method comprising the steps of;

detecting a depression of the brake pedal, determining a vehicle speed which the automotive vehicle is running at, determining a deceleration which the automotive vehicle is subject to, detecting a present gear position which the automatic transmission is conditioned in, determining a reference deceleration value in response to the present gear position detected and the vehicle speed detected, comparing the deceleration determined with the reference deceleration value determined, determining a new gear position lower than the present gear position which the automatic transmission should be downshifted to in response to the comparing result, and effecting a downshift from the present gear position in the automatic transmission to the new gear position determined to condition the same in a state for engine brake running at the new gear position when the automatic transmission operates in the automatic drive range.

BRIEF DESCRIPTION OF THE DRAWINGS

FIGS. 2A, 2B, and 2C when combined side by side, illustrate an electro-hydraulic control system for the automatic transmission shown in FIG. 1;

FIG. 4b is a flowchart of a program for determining a deceleration which an automotive vehicle is subject to;

FIGS. 5A and 5B, when combined, shows a flowchart of a program for determining a new gear position which the automatic transmission should be conditioned in;

FIG. 6 is a flowchart of a program for conducting decrements of downshift timer (TDS) and delay timer (T);

FIG. 7 is a flowchart of a program for protecting overrun of the engine;

FIG. 10 is a graph illustrating a downshift schedule stored in a read-only-memory (ROM) in terms of deceleration values versus various vehicle speed values.

DETAILED DESCRIPTION OF THE INVENTION

Figure 1:
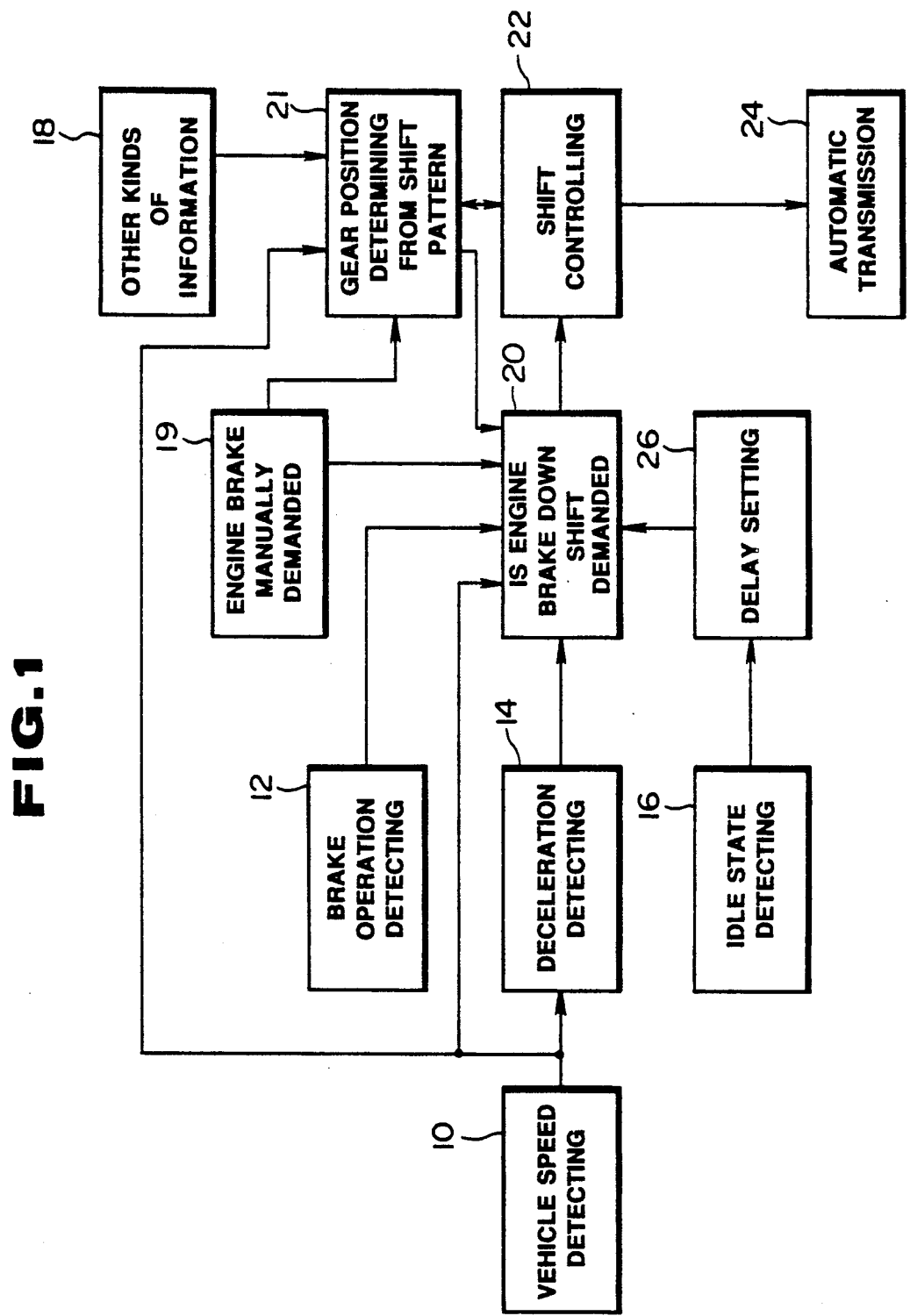
FIG. 1 is a functional block diagram of an embodiment according to the present invention.

FIG. 1 shows a functional block diagram of an embodiment of an engine brake running control system according to the present invention. A vehicle speed detecting block 10 counts the number of pulses generated by a transmission output shaft revolution speed sensor for a predetermined period of time (for example, 100 ms or 354 ms) and generates a vehicle speed indicative signal indicative of the content of the counter. The sensor includes a pulse generator V provided on an output shaft 6 of an automatic transmission 24. A brake operation detecting block 12 is provided where a brake signal generated by a brake switch is detected and it is determined whether the brake is depressed or released.

A deceleration detecting block 14 is provided where a derivative of the vehicle speed indicative signal from the vehicle speed detecting block 10 during a predetermined period of time is calculated and the result is outputted as a deceleration indicative signal. Alternatively, the deceleration which the vehicle is subject to can be directly given by a deceleration sensor mounted to measure the longitudinal deceleration which the vehicle is subject to. An idle state detecting block 16 is provided where an output signal of an idle switch is detected and it is determined whether the engine throttle valve is at the idle speed position or not. The idle switch is arranged within the engine throttle chamber. A block 18 is provided where the other kinds of information, such as a throttle opening degree and an oil temperature of oil used in the automatic transmission, which are necessary for the shifting control are detected and generated as output signals. A block 19 is provided where it is determined whether an engine brake running is demanded or not. More specifically, it is detected at the block 19 whether a selector of a manual valve is placed at a manual "2" range or "1" range position or an overdrive (OD) switch is pressed. When the OD switch is pressed, an upshift to the overdrive fourth gear position is inhibited. The output signal of the block 19 is fed to a block 20.

The block 20 is provided for determining whether there is any demand for engine brake downshift and a new gear position which the automatic transmission should be shifted down to. Fed to this block 20 are the vehicle speed indicative signal from the block 10, the brake operation indicative signal from the block 12, the idle operation indicative signal from a block 26 accompanied by a delay, and the output signal from the block 19. At the block 20, it is determined whether predetermined conditions are met for effecting downshifting for an engine brake running or not and a new gear position is determined which the automatic transmission should be shifted down to. The output of the block 20 indicative of the result is fed to a shift controlling block 22.

The outputs of the blocks 10, 18 and 19 are fed to a block 21 where a desired gear position which the automatic transmission should be conditioned in is determined by a table look-up operation of a shift point mapping table in a conventional manner. For example, an appropriate shift point mapping table for engine brake running is selected and set for use when the output of the block 19 indicates that the selector is placed at the manual "2" or "1" range position. An output of the block 21 indicative of the desired gear position is fed to the shift controlling block 22.

The shift controlling block 22 controls shifting in gear position in the automatic transmission 24 in a conventional manner in the absence of the output signal from the block 20 indicative of the fact that the predetermined conditions for effecting downshifting for engine brake running are met. However, upon receipt of the output signal from the block 20 indicative of the fact that the predetermined conditions for effecting downshifting for engine brake running are met, the shift controlling block 22 commands downshifting and engaging of a clutch for effecting engine brake running, namely an overrunning clutch in the case of the automatic transmission used herein.

In this embodiment, the automatic transmission 24 is of the RE4R01A type described in "Nissan FULL-RANGE AUTOMATIC TRANSMISSION RE4R-01A TYPE, Service Manual, (A261C07)" issued on March, 1987 by Nissan Motor Company Limited. The automatic trnasmission of the above mentioned type is also disclosed in the before mentioned U.S. Pat. No. 4,680,992 (Hayasaki et al.) which is hereby incorporated in its entirety by reference.

Referring to FIGS. 2A, 2B, 2C, and 3, the automatic transmission 24 is briefly described.

Figure 2A:
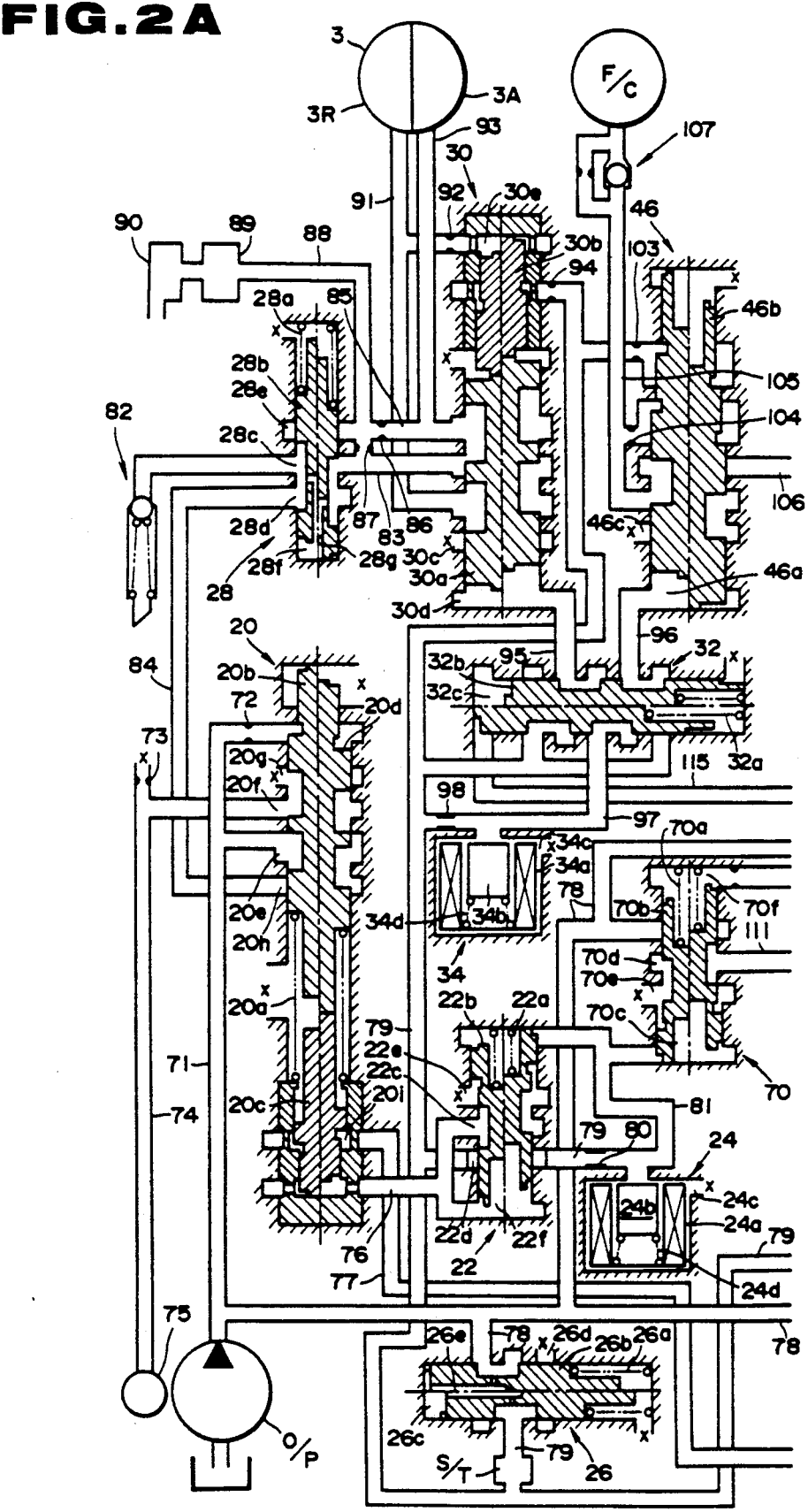
Figure 2B:
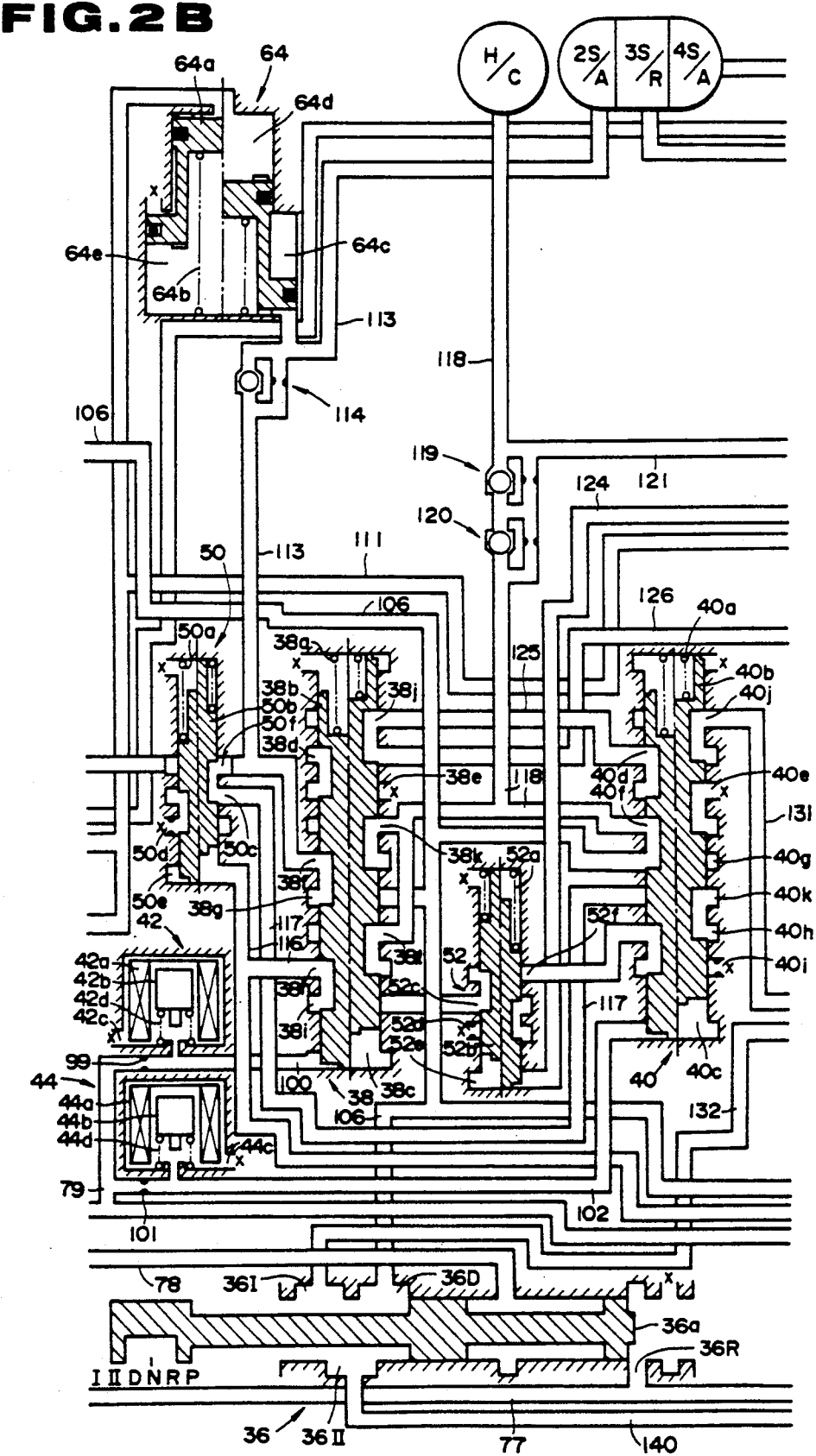
Figure 3:
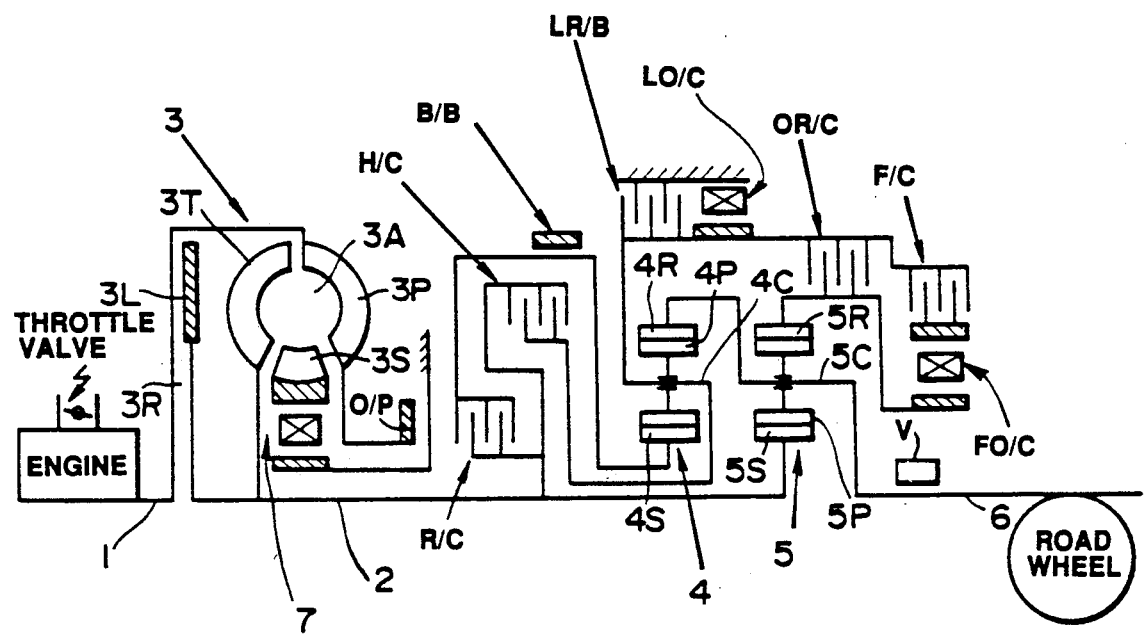
FIG. 3 is a schematic view showing the gear train of the automatic transmission in association with an internal combustion engine and a road wheel shown in block diagram.

FIG. 3 shows a schematic diagram of a gear train for the automatic transmission 24, and FIGS. 2A, 2B, and 2C when combined illustrate a hydraulic circuit of a control valve assembly for the automatic transmission 24. The detailed description along with these Figures is hereby omitted because the same is found in U.S. Pat. No. 4,680,992 issued to Hayasaki et al. on Jul. 21, 1987, which has been hereby incorporated by reference in its entirety. Particular attention should be paid to the descriptive parts in connection with FIGS. 1A, 1B, and 1C and 2 of this U.S. patent.

Briefly, in FIG. 3, the overrunning clutch mentioned before is denoted by the reference character OR/C.

Referring to FIGS. 2A, 2B, and 2C, an overrunning clutch solenoid 60, a shuttle valve 56, an overrunning clutch control valve 58, and an overrunning clutch reducing valve 62 perform an engine brake control where the overrunning clutch OR/C is engaged. The overrunning clutch solenoid 60, the shuttle valve 56, and a 3-2 timing valve 48 perform a 3-2 timing control. Further, two shift solenoids 42 and 44 and two shift valves 38 and 40 perform an automatic shift control among first, second, third and fourth (overdrive) gear positions. By setting the energization and/or de-energization of the shift solenoids 42 and 44, the transmission may be conditioned in any desired gear position. For further information relating to this control, reference should be made to co-pending U.S. patent application of Yasushi Narita Ser. No. 07/301,352 filed on Jan. 25, 1989 and assigned to the same assignee which the present application is to be assigned.

Hereinafter, the flowcharts of control programs stored in a memory, such as a read only memory (ROM), of a control unit are described in association with the functional diagram shown in FIG. 1.

Figure 4A:
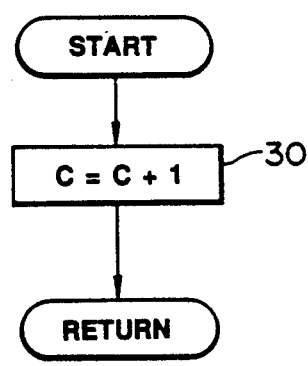
FIG. 4a is a flowchart of a program for counting a pulse generated by a vehicle speed sensor for detecting a revolution speed of a transmission output shaft.
Figure 4B:
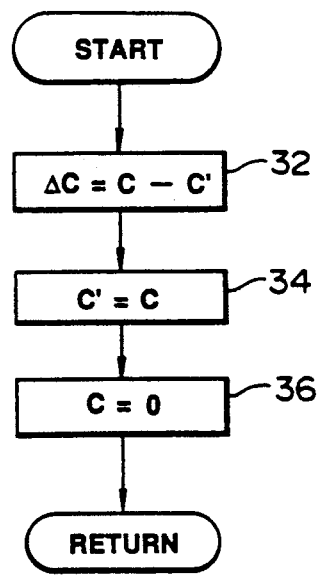

Referring to FIGS. 4a and 4b, the vehicle speed detecting block 10 and the deceleration detecting block 14 are further described. This block has a counter C which counts the number of pulses from the transmission output shaft revolution speed sensor. The execution of a program as shown by the flowchart in FIG. 4a is initiated by interruption occurring in synchronous with the occurence of pulse signal from the transmission output shaft revolution speed sensor. At a step 30, the content of the counter C is increased by one. The execution of a program as illustrated in a flowchart in FIG. 4b is initiated upon expiration of a predetermined period of time for example 100 ms or 354 ms. At a step 32, a difference ΔC (delta C) is calculated by subtracting C' from C, where C represents the present content of the counter, while C' the previous content of the counter given the predetermined period of time ago. At a step 34, C' is updated and set equal to C. Then, at a step 36, C is cleared and set equal to 0 (zero). It will be noted that the content of the counter C is indicative of a vehicle speed (VSP) which the vehicle is running at. The difference ΔC (delta C) reveals a negative value when the vehicle is subject to a deceleration (α, alpha) and the absolute value of this difference ΔC (delta C) is proportional to the magnitude of the deceleration alpha. Of course, the deceleration may be determined by directly detecting the deceleration by a vehicle mount deceleration sensor (or an accelerenometer).

Figure 5B:
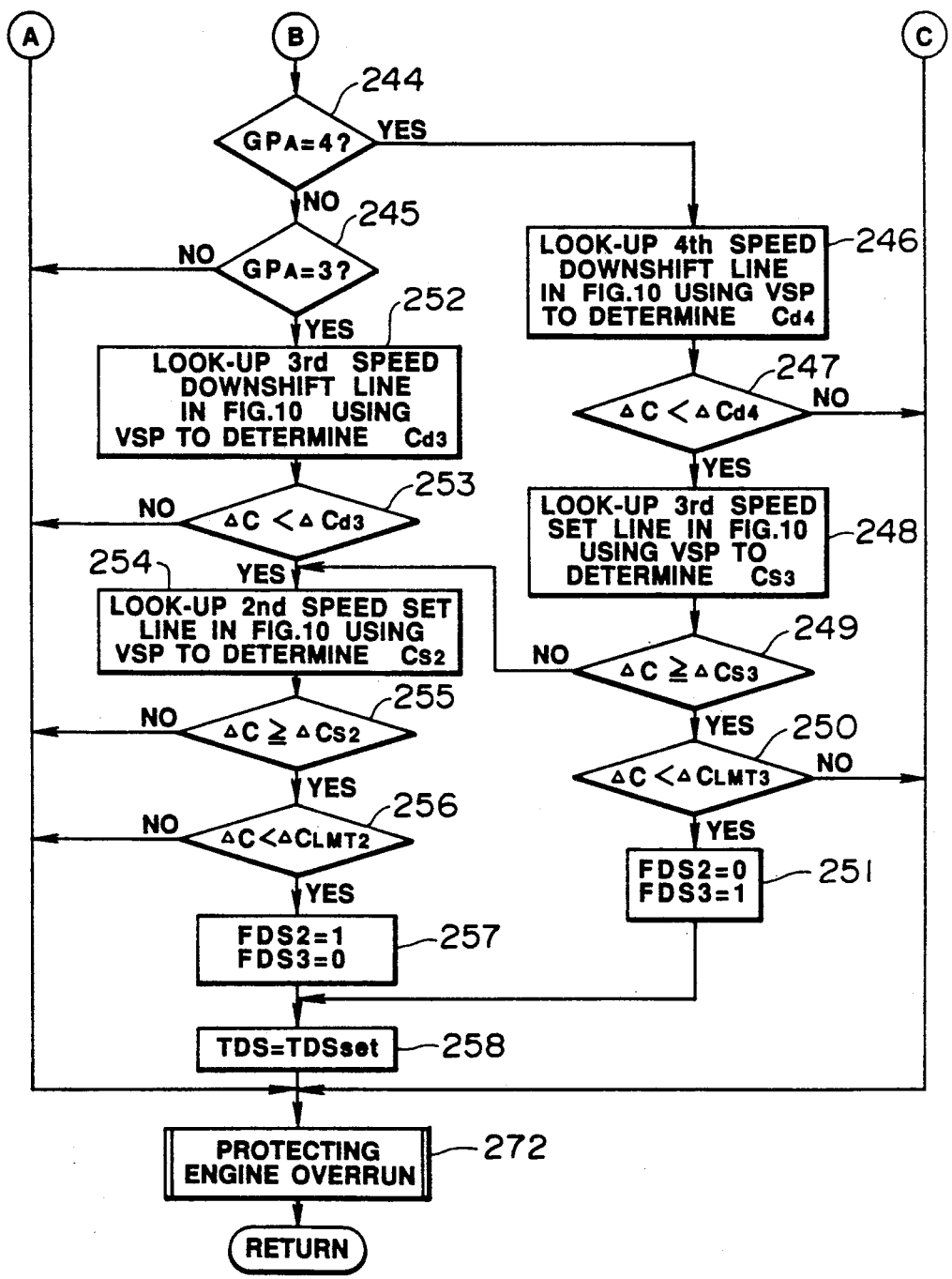

Referring to the flowchart shown in FIGS. 5A and 5B, the function assigned to the block 20 is described.

In FIGS. 5A and 5B, at a step 230 it is determined whether the manual valve is placed at the "D" range position (viz., the automatic drive range position) or not. If an answer to this inquiry is NO, the program proceeds to a step 231 where the flags FDS2 and FDS3 are reset to 0 and ends since the automatic engine brake running is not required when the manual valve, is placed at the "2" or "1" range position. The downshift flag FDS2 indicates an instruction to effect an engine brake running at the second gear position when it is set equal to 1, while the other downshift flag FDS3 an instruction to effect an engine brake running at the third gear position. The downshift flag FDS2 also serves as a flag to inhibit upshift to the third gear position upward, while the downshift flag FDS3 a flag to inhibit upshift to the fourth speed.

If the inquiry at step 230 is YES, the program proceeds to a step 232 where it is determined whether the accelerator pedal is released or not, viz., whether the idle state indicative switch is ON or not. If the "D" range is selected and the accelerator pedal is released, the program proceeds from the step 232 to a step 233 where it is determined whether an idle flag FIDL has been set equal to 1 or not. If the idle flag FIDL is not equal to 1, the program proceeds to a step 234 where the idle flag FIDL is set equal to 1 and the downshift flag FDS2 is reset to 0 (zero). Then, it proceeds to a step 235 where the downshift flag FDS3 is reset to 0 (zero). If it is determined at the step 233 that the idle flag FIDL is equal to 1, the program proceeds to a step 236 where it is determined whether the overdrive inhibitor button (OD) is pressed by the driver or not. When the overdrive inhibitor button (OD) is pressed, the automatic transmission is inhibited from operating at the fourth gear position (overdrive). If the overdrive is inhibited, the program proceeds to the step 235 where the downshift flag FDS3 is reset to 0 (zero) to cancel the instruction to effect engine brake running at the third gear position.

At the subsequent step 237, it is determined whether the brake pedal is depressed or not (viz., whether the brake switch designed to be turned ON in response to depression of the brake pedal is ON or not). If the brake pedal is not depressed, indicating that substantially great engine brake effect is not required, the program proceeds to step 238 where it is determined whether the present gear position $GP_A$ is set equal to 4 or not. The program proceeds further to step 239 and 240 to reset the downshift flag FDS2 to 0 (zero) and set the other downshift flag FDS3 equal to 1 instead if the present gear position $GP_A$ is the fourth gear position and the downshift flag FDS2 has been set to 1. Accordingly, the automatic engine brake 4-2 downshift instruction which has been set is cancelled if the brake pedal is released.

If the brake pedal is depressed, indicating that the substantially great engine brake effect is required, the program proceeds to step 241 where it is determined whether the downshift flag FDS2 is set equal to 1 or not. At this step 241 and step 242, the states of the downshift flag FDS2 and/or FDS3 are checked. If the downshift flag FDS2 is equal to 1 or FDS3 is equal to 1, indicating that the automatic transmission is conditioned for engine brake running, the states of the downshift flags FDS2 and FDS3 are updated whenever the content of the downshift timer TDS becomes 0 (zero). The timer TDS is set equal to $TDS_{set}$ at a step 258 later mentioned and the decrement is conducted at a predetermined interval (for example, 10 msec) by executing a program shown in FIG. 6. If, as a result of checking operation at the steps 241 and 242, it is confirmed that the downshift flag FDS2 is 0 (zero) and the downshift flag FDS3 is 0 (zero), the states of these downshift flags FDS2 and FDS3 are updated immediately regardless of the content of the downshift timer TDS.

Referring particularly to FIG. 5B, the manner of updating the states of the downshift flags FDS2 and FDS3 is hereinafter explained. At steps 244 and 245, it is determined whether the present gear position $GP_A$ is equal to the fourth gear position or the third gear position or not. If the present gear position $GP_A$ is the fourth gear position, the program proceeds from the step 244 to a step 246. At the step 246, a table look-up operation of the 4th speed downshift line shown in FIG. 10 is conducted using the vehicle speed VSP determined at the program in FIG. 4b to determine a downshift reference deceleration value $\Delta C_{d4}$ for the present value of VSP. Then, at a step 247, the deceleration $\Delta C$ determined by execution of the program shown in FIG. 4b is compared with the downshift reference decelartion value $\Delta C_{d4}$ determined at the step 246. If it is determined at the step 247 that $\Delta C$ is not less than $\Delta C_{d4}$ (viz., $\Delta C \geq \Delta C_{d4}$), the states of the downshift flags FDS2 and FDS3 remain unchanged. Since $\Delta C$ has a negative sign when the vehicle is subject to deceleration, the fact that $\Delta C \geq \Delta C_{d4}$ at the step 247 indicates that the actual deceleration falls in a range disposed on the righthand side of the 4th speed downshift line as viewed in FIG. 10. In other words, this is the case where the magnitude of deceleration does not exceed the magnitude of downshift reference deceleration value. In this case, it is not required that the automatic transmission be downshifted from the fourth gear position to a new gear position lower than the fourth gear position and conditioned for engine brake running at the new gear position. If it is determined at the step 247 that $\Delta C$ is less than the downshift reference deceleration value $\Delta C_{d4}$, the program proceeds to a step 248 where a table look-up operation of a third speed set line shown in FIG. 10 is conducted using the vehicle speed VSP to determine a set reference deceleration value $\Delta C_{s3}$. Then, the program proceeds to a step 249 where $\Delta C$ is compared with $\Delta C_{s3}$. If it is determined at the step 249 that $\Delta C$ is not less than $\Delta C_{s3}$ (viz., $\Delta C \geq \Delta C_{s3}$), the program proceeds to a step 250. The fact that $\Delta C$ is not less than $\Delta C_{s3}$ indicates that it falls in a range disposed on the righthand side of the 3rd speed set line as viewed in FIG. 10. This is the case where the deceleration which the automotive vehicle is subject to falls in the 4-3 downshift range as shown in FIG. 10. At the above-mentioned step 250, the deceleration $\Delta C$ is compared with a third speed limit value $\Delta C_{LMT3}$ as represented by a third speed limit line in FIG. 10. If the deceleration $\Delta C$ is not less than $\Delta C_{LMT3}$, the program proceeds to a step 272 with the downshift flags FDS2 and FDS3 left unchanged. This is the case where the deceleration falls in a range below the 3rd speed limit line as viewed in FIG. 10. If it is determined at the step 250 that $\Delta C$ is less than $\Delta C_{LMT3}$, the program proceeds to a step 251 where the downshift flag FDS2 is reset to 0 (zero) and the downshift flag FDS3 is set to 1.

If it is determined at the step 245 that the present gear position $GP_A$ is equal to the third gear position, the program proceeds along steps 252, 253, 254, 255, and 256 down to a step 257 in the case where the deceleration $\Delta C$ falls in a 3-2 downshift range as viewed in FIG. 10. The steps 252, 253, 254, 255 and 256 are substantially the same as the previously described steps 246, 247, 248, 249, and 250 except that a downshift reference deceleration value $\Delta C_{d3}$ derived from a 3rd speed downshift line (see FIG. 10), a 2nd speed set value $\Delta C_{S2}$ derived from a 2nd speed set line (see FIG. 10), and a 2nd speed limit line are used instaed of their counterparts. At the step 257, the downshift flag FDS2 is set to 1 and the other downshift flag FDS3 is reset to 0 (zero).

If, at the previously mentioned step 249, it is determined that $\Delta C$ is less than $\Delta C_{S3}$, the program proceeds to the step 254. If the deceleration $\Delta C$ falls in a 4-2 downshift range defined between the 3rd speed set line, 2nd speed set line and 2nd speed limit line as viewed in FIG. 10, the program proceeds from the step 254 down through the steps 255 and 256 to the step 257 where the downshift flag FDS2 is set to 1 and the downshift flag FDS3 is reset to 0 (zero).

After the step 251 or 257, the program proceeds to the step 258 where the downshift timer TDS is set equal to a predetermined value $TDS_{set}$.

Referring back to FIG. 5A, if it is determined at the step 232 that the accelerator pedal is being depressed, the program proceeds to a step 259 where it is determined whether the idle flag FIDL is set or not in order to judge whether the accelerator pedal had been depressed or not during the previous run of this program. In other words, if this depression of the accelerator pedal has taken place after release of the accelerator pedal, the program proceeds from the step 259 to steps 260, 264, and 265 or steps 260, 261, 263, and 265, or steps 260, 261, 262, and 265. In each of these process, the timer T is set equal to a delay time value DLY23 (at step 264) or a delay time value DLY34 (at step 263) or zero (at step 262). If the accelerator pedal is being kept depressed, the program proceeds from the step 259 directly down to a step 266.

The delay timer T is provided for providing a delay between the instant when the accelerator pedal is depressed again from the released position and the instant when the automatic engine brake running state is released in response to the depression of the accelerator pedal. If the downshift flag FDS2 is being set, the delay timer T is set equal to the predetermined delay timer value DLY23 at the step 264. If the downshift flag FDS3 is being set with the downshift flag FDS2 being reset, the delay timer T is set equal to another predetermined delay time value DLY34. If both of the downshift flags FDS2 and FDS3 are reset, the downshift timer T is reset to 0 (zero).

Decrement of this delay timer T is conducted by executing the program shown in FIG. 6. In FIG. 5A, upon elapse of the predetermined delay timer value set at the delay timer T, the program proceeds from the step 266 down to a step 267. That is, upon elapse of the delay time beginning with the depression of the accelerator pedal after release of the accelerator pedal, the program proceeds to the step 267. At steps 267 and 268, it is checked whether there occurs the engine brake running state due to the setting of the downshift flag FDS2 or FDS3. If there occurs no engine brake running state, the program proceeds through the steps 267 and 268 and ends. In this case, the downshift flags FDS2 and FDS3 are kept equal to 0 (zero), respectively. If the automatic transmission is downshifted to the third gear position and conditioned for engine brake running in response to setting of FDS3 equal to 1, the program proceeds from the step 268 to a step 269 where the downshift flag FDS3 is reset to 0 (zero), inducing the release of the engine braking running state. If the automatic transmission is downshifted to the second gear position and conditioned for engine brake running in response to setting of FDS2 equal to 1, the program proceeds from the step 267 down to seps 270 and 271, causing the automatic transmission to be conditioned for engine brake running at the third gear position before released from the engine brake running state upon elapse of a predetermined delay time value DLY234. At the step 270, the delay timer T is set equal to the predetermined delay time value DLY234 which provides an appropriate length of delay during which the engine brake running state at the third gear position after the release of the engine brake running state at the second gear position is held. At the step 271, the downshift flag FDS is set to 0 (zero) and the downshift flags FDS3 is set to 1. In the process of the subsequent runs of the program, the downshift flag FDS3 is reset to 0 (zero), terminating the automatic engine brake running state upon elapse of the the delay timer value DLY234.

Referring to FIG. 5B, at a step 272, the execution of a sub-program as shown in FIG. 7 is initiated to protect engine overrun.

Referring to FIG. 7, at steps 308 and 310 a check is initiated to determine no automatic engine brake running state (FDS2=0, FDS3=0) occurs or engine brake running state at the third gear position (FDS3=1) or engine brake running state at the second gear position (FDS=1). The program ends after the step 310 when no engine brake running state occurs. The program proceeds along the steps 74 and 75 down to a step 76 when an engine brake running state at the third gear position occurs. At the step 312, if it is determined that the vehicle speed is greater than or equal to a predetermined vehicle speed value VMAX3 and thus the engine speed is excessively high, the downshift flag FDS3 is reset to 0 (zero) at a step 314, thus preventing overrun of the engine by inducing an upshift from the third gear position in the automatic transmission. If the engine brake running state at the second gear position is available, the program proceeds along the steps 308 and 316. If it is determined at the step 316 that the vehicle speed VSP is greater than or equal to another predetermined vehicle speed value VMAX2 and thus the engine speed is excessively high, the downshift flag FDS2 is reset to 0 (zero) and the downshift flag FDS3 is set to 1, thus preventing overrun of the engine by inducing the engine brake running state at the third gear position rather than the second gear position. Thereafter, with the process at steps 312 and 314, the engine overrun is prohibited.

The decrements of the downshift timer TDS and delay timer T are conducted by executing a sub-program shown in FIG. 6 which is executed upon elapse of a predetermined period of time, for example 10 ms. In FIG. 6, at a step 300 it is determined whether the content of the delay timer T is 0 (zero) or not. If it is determined that the content of the delay timer T is not yet 0 (zero, the program proceeds to a step 302 where the content of the timer T is decreased by 1 (decrement of the delay timer T), then the program proceeds to steps 304 and 306 where decrement of the downshift timer TDS is conducted.

Figure 8:
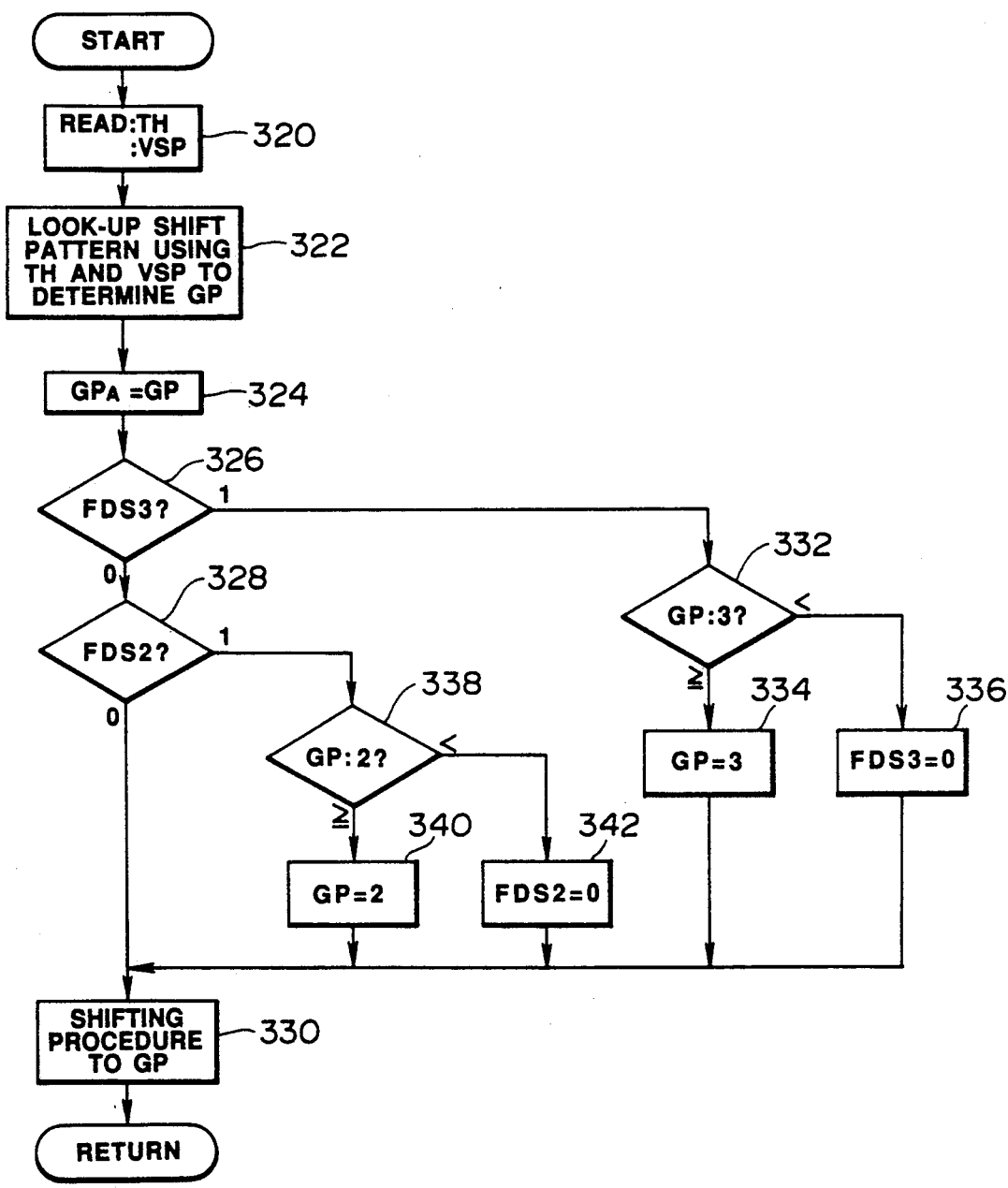
FIG. 8 is a flowchart of a program for determining a new gear position which the automatic transmission should be conditioned in after comparing a gear position obtained by retrieving a predetermined shift pattern provided for the automatic drive range with a new gear position determined by the flowchart shown in FIGS. 5A and 5B.
Figure 9:
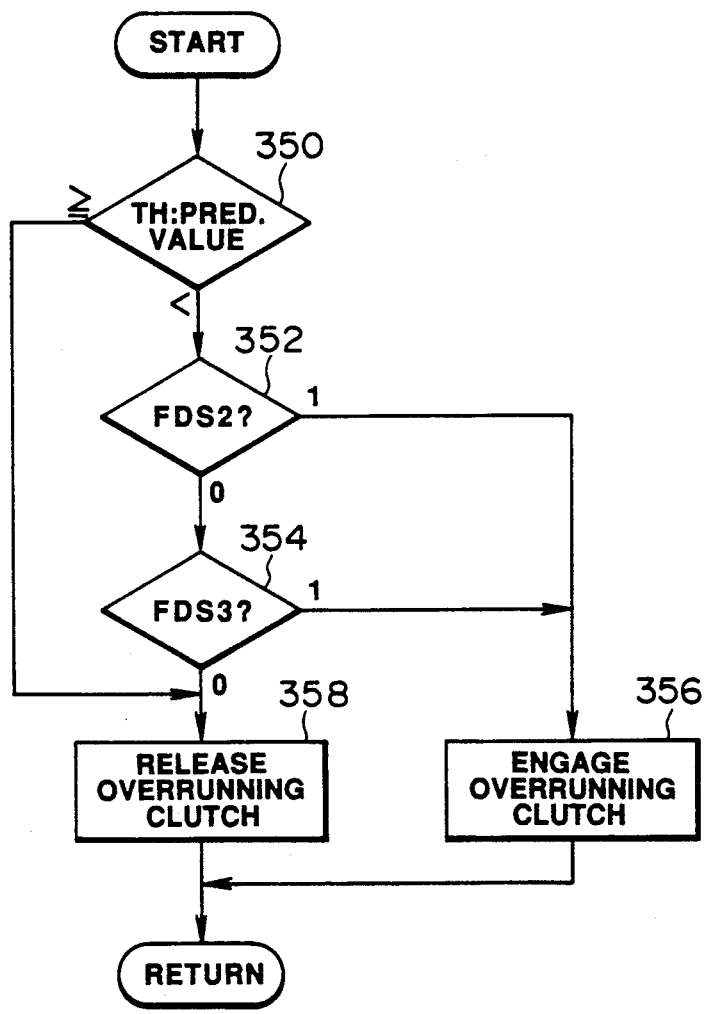
FIG. 9 is a flowchart of a program for controlling engagement of an overrunning clutch which when engaged conditions the automatic transmission for engine brake running.

Referring to FIGS. 8 and 9, the functions assigned to the blocks 21 and 22 are described.

In FIG. 8, a reading operation is performed at step 320 to store TH (throttle opening degree) and VSP (vehicle speed) as operating condition indicative variables. At step 322, using TH and VSP stored, an appropriate shift point mapping table is selected and a table look-up of the shift point mapping table selectd is conducted to determine a desired gear position GP. At the sebsequent step 324, this desired gear position GP is set as the actual gear position $GP_A$. At steps 326 and 328, it is checked whether there occurs no engine brake running state (FDS3=0, FDS=2) or engine brake running state at the third gear position (FDS3=1) or engine brake running state at the second gear position (FDS2=1). If there occurs no automatic engine brake running state, the program proceeds to a step 330 where usual shifting procedure brings the actual gear position into agreement with the desired gear position GP.

If an engine brake running state at the third gear position occurs the program proceeds from the step 326 to a step 332 where it is checked whether GP is greater than or equal to 3 (third gear position) or not. If GP is greater than or equal to 3, GP is set equal to 3 at a step 334. If GP is less than 3, the program program proceeds to a step 336 where the downshift flag FDS3 is reset to 0 (zero) and then proceeds to the step 330.

If there occurs engine brake running state at the second gear position, the program proceeds from the step 328 to a step 338 where it is checked whether GP is greater than or equal to 2 or not. If GP is greater than or equal to 2, GP is set equal to 2 at a step 340. If GP is less than 2, the program proceeds to a step 342 where the downshift flag FDS2 is rest to 0 (zero) and then proceeds to the step 330.

Referring to FIG. 9, at step 350, the throttle valve opening TH is compared with a predetermined value. If TH is greater than or equal to the predetermined value, the program proceeds to a step 358 where the overrunning clutch OR/C is released. If TH is less than the predetermined value, the program proceeds to a step 352 where it is determined whether the downshift flag FDS2 is set or not. If this flag FDS2 is set, where the overrunning clutch OR/C is engaged at a step 356, inducing engine brake running state. If the downshift flag FDS3 is set, the overrunning clutch is engaged at the step 356, inducing engine brake running state. From this description, it will be understood that the overrunning clutch OR/C is engaged whenever at least one of the downshift flags FDS2 and FDS3 is set equal to 1. If both of them are reset to 0 (zero), the engine brake running state is released.

What is claimed is:

1. An engine brake running control system for an automotive vehicle including a brake pedal and an automatic transmission shiftable in gear position according to a predetermined shift point mapping when the automatic transmission operates in an automatic drive range, the engine brake running control system comprising:
   means for detecting a depression of the brake pedal;
   means for determining a vehicle speed which the automotive vehicle is running at;
   means for determining a deceleration which the automotive vehicle is running at;
   means for detecting a present gear position which the automatic transmission is conditioned in;
   means for determining a reference deceleration value in response to said present gear position detected and said vehicle speed detected, comparing said deceleration determined with said reference deceleration value determined and producing a result and determining a new gear position lower than said present gear position which the automatic transmission should be downshifted to in response to said result; and means for effecting a downshift from the present gear position in the automatic transmission to said new gear position determined to condition same in a state for engine brake running at said new gear position when the automatic transmission operates in the automatic drive range.

2. An engine brake running control system as claimed in claim 1, wherein said deceleration value determining means has a memory storing a predetermined downshift schedule line consisting of a set of deceleration values retrievable versus said vehicle speed, and a speed set line consisting of a different set of deceleration values retrievable versus said vehicle speed, and means for retrieving said downshift line when said present gear position is equal to a predetermined gear position to determine a first deceleration value corresponding to said vehicle speed detected, comparing said deceleration detected with said first deceleration value; means responsive to the result of said comparison for retrieving said speed set line versus said vehicle speed detected to determine a second deceleration value, and means for comparing said deceleration detected with said second deceleration value, and means for determining said new gear position responsive to the result of said comparison of said deceleration value with said second deceleration value.

3. An engine brake running control system as claimed in claim 2, wherein said downshift line and said speed set line are provided for said new gear position.

4. An engine brake running control method for an automotive vehicle including a brake pedal and an automatic transmission shiftable in gear position according to a predetermined shift point mapping when the automatic transmission operates in an automatic drive range, the engine brake running control method comprising the steps of:

detecting a depression of the brake pedal;

determining a vehicle speed which the automotive vehicle is running at;

determining a deceleration which the automotive vehicle is subject to;

detecting a present gear position which the automatic transmission is conditioned in;

determining a reference deceleration value in response to said present gear position detected and said vehicle speed detected;

comparing said deceleration determined with said reference deceleration value determined and producing a:

determining a new gear position lower than said present gear position which the automatic transmission should be downshifted to in response to said result; and effecting a downshift from the present gear position in the automatic transmission to said new gear position determined to condition the same in a state for engine brake running at said new gear position when the automatic transmission operates in the automatic drive range.

* * * * *